(12) United States Patent
Hwang et al.

(10) Patent No.: US 11,676,100 B2
(45) Date of Patent: Jun. 13, 2023

(54) ELECTRONIC APPARATUS FOR MANAGING CARRYING-OUT ON FULFILLMENT CENTER AND CONTROLLING METHOD THEREOF

(71) Applicant: Coupang Corp., Seoul (KR)

(72) Inventors: Ji Won Hwang, Seoul (KR); Woo Jung Park, Seoul (KR); Gyeong Hwa Lee, Seoul (KR); Dae Yong Jang, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/149,612

(22) Filed: Jan. 14, 2021

(65) Prior Publication Data

US 2022/0172154 A1 Jun. 2, 2022

(30) Foreign Application Priority Data

Dec. 2, 2020 (KR) .................. 10-2020-0166821

(51) Int. Cl.
*G06Q 10/00* (2023.01)
*G06Q 10/087* (2023.01)
*G06Q 10/0835* (2023.01)
*G06Q 10/0836* (2023.01)

(52) U.S. Cl.
CPC ....... *G06Q 10/087* (2013.01); *G06Q 10/0835* (2013.01); *G06Q 10/0836* (2013.01)

(58) Field of Classification Search
CPC ............. G06Q 10/087; G06Q 10/0835; G06Q 10/0836
See application file for complete search history.

(56) References Cited

U.S. PATENT DOCUMENTS

| | | | |
|---|---|---|---|
| 10,565,544 B1 | 2/2020 | Lee et al. | |
| 11,055,661 B1 | 7/2021 | Yang et al. | |
| 2005/0278062 A1* | 12/2005 | Janert | G06Q 50/28 700/214 |
| 2007/0017984 A1* | 1/2007 | Mountz | G06Q 10/087 235/385 |
| 2011/0320320 A1* | 12/2011 | Dearlove | G06Q 30/06 705/27.1 |

(Continued)

FOREIGN PATENT DOCUMENTS

| | | |
|---|---|---|
| CN | 107424040 A | 12/2017 |
| CN | 108681856 A | 10/2018 |

(Continued)

*Primary Examiner* — Rokib Masud
(74) *Attorney, Agent, or Firm* — Knobbe, Martens, Olson & Bear, LLP

(57) ABSTRACT

According to the present disclosure, a controlling method of an electronic apparatus for managing carrying-out from a fulfillment center, the controlling method including acquiring carrying-out request information related to items placed in a fulfillment center, generating pieces of carrying-out information according to vendors based on the acquired carrying-out request information, providing at least one of the pieces of generated carrying-out information to a terminal, receiving carrying-out processing response information from the terminal in response to the provided piece of carrying-out information, and generating state information of items corresponding to the carrying-out processing response information is provided.

14 Claims, 12 Drawing Sheets

Carrying-out state

| Type of period | Time period | Tote barcode | Internal carrying-out number | External carrying-out number | |
|---|---|---|---|---|---|
| Date and time of starting collection ▾ | 2020-06-09 ~ 2020-06-23 | | | | Q View |
| Status | Container barcode | Carrying-out group number | External SKU ID | Item barcode | Vendor name |
| All ▾ | | | | | |

| Tote barcode | Carrying-out group number | External carrying-out number | Internal carrying-out number | Vendor name | Date and time of finishing collection | Quantity of collected items | Container barcode | Status | Date and time of finishing loading | Vehicle license number/ invoice number |
|---|---|---|---|---|---|---|---|---|---|---|
| GC-GP1-121-1 | 73 | WAKLE | 91 | VendorA | 2020-06-23 17:35 | 1 | CT20-0612-0050 | finishing loading | 2020-06-23 17:35 | 2020062317 |
| GC-GP1-122-1 | 74 | WAKLE_23 | 91 | VendorA | 2020-06-23 17:35 | 2 | CT20-0612-0050 | finishing loading | 2020-06-23 17:35 | 2020062317 |

(56) References Cited

U.S. PATENT DOCUMENTS

2020/0234219 A1  7/2020  Namba et al.
2020/0279220 A1  9/2020  Mo et al.

FOREIGN PATENT DOCUMENTS

| | | | |
|---|---|---|---|
| JP | 2002-002924 | | 1/2002 |
| JP | 2002002924 | * | 1/2002 |
| JP | 2006-236172 | | 9/2006 |
| JP | 4127001 B2 | | 7/2008 |
| JP | 2008-239337 | | 10/2008 |
| JP | 2015-214411 | | 12/2015 |
| JP | 2017-001820 | | 1/2017 |
| JP | 2020-0071740 | | 5/2020 |
| JP | 2020-119166 A | | 8/2020 |
| KR | 10-2008-0107930 A | | 12/2008 |
| KR | 10-2015-0072395 A | | 6/2015 |
| KR | 10-2016-0002527 A | | 1/2016 |
| KR | 10-1783598 B1 | | 9/2017 |
| KR | 10-1953069 B1 | | 2/2019 |
| KR | 10-2019-0098865 | | 8/2019 |
| KR | 10-2020-0105737 A | | 9/2020 |
| KR | 10-2173803 B1 | | 11/2020 |
| WO | WO-0175746 A2 * | 10/2001 | ........... G06Q 10/087 |

* cited by examiner

FIG. 3

Carrying-out plan

| Generation date and time | Processing status | Purchased or not | Internal carrying-out number |
|---|---|---|---|
| 2020-06-07 ~ 2020-06-20 | All | All | |

| Vendor name | Item barcode | External SKU ID | External carrying-out number |
|---|---|---|---|
| | | | |

Carrying-out group number

[Q View]

| Carrying-out group number | External carrying-out number | Internal carrying-out number | Date and time of generating carrying-out instruction | Deadline for carrying-out | Purchased or not | Vendor name | Number of SKU types | Requested carrying-out quantity | Finished collection quantity | Finished carrying-out quantity | Unloaded problematic quantity | Status |
|---|---|---|---|---|---|---|---|---|---|---|---|---|
| 74 | RFM | 94 | 2020-03-17 00:00:00 | 2020-04-05 00:00:00 | Vendor item | VendorA | 1 | 5 | 0 | 0 | 0 | Finish of carrying-out |
| 52 | WAKLE | 93 | 2020-06-17 12:07:41 | 2020-07-02 00:00:00 | Vendor item | VendorB | 1 | 3 | 0 | 0 | 0 | Finish of preparation of loading |

Carrying-out state

| Type of period | Time period | Tote barcode | Internal carrying-out number | External carrying-out number |
|---|---|---|---|---|
| Date and time of starting collection ∨ | 2020-06-09 ~ 2020-06-23 | | | |

| Status | Container barcode | Carrying-out group number | External SKU ID | Item barcode | Vendor name |
|---|---|---|---|---|---|
| All ∨ | | | | | |

[Q View]

| Tote barcode | Carrying-out group number | External carrying-out number | Internal carrying-out number | Vendor name | Date and time of finishing collection | Quantity of collected items | Container barcode | Status | Date and time of finishing loading | Vehicle license number/ invoice number |
|---|---|---|---|---|---|---|---|---|---|---|
| GC-GP1-121-1 | 73 | WAKLE | 91 | VendorA | 2020-06-23 17:35 | 1 | CT20-0612-0050 | finishing loading | 2020-06-23 17:35 | 2020063217 |
| GC-GP1-122-1 | 74 | WAKLE_23 | 91 | VendorA | 2020-06-23 17:35 | 2 | CT20-0612-0050 | finishing loading | 2020-06-23 17:35 | 2020063217 |

Details of carrying-out error

Date of error report: 2020-06-08 ~ 2020-06-22

Type of problem: All

[View]

| Date and time of report | Reporter | Carrying-out group number | External carrying-out number | Internal carrying-out number | Type of problem | Location | SKU ID | Item name | Quantity to be collected | Quantity actually collected | Problematic quantity | Whether problem is solved |
|---|---|---|---|---|---|---|---|---|---|---|---|---|
| 2020-06-22 10:10:50 | shhwang | 65 | WAKLE | 79 | Lack of quantity | 14-31F | 26449 | ItemA | 3 | 1 | 2 | Solved |
| 2020-06-22 10:10:29 | shhwang | 65 | WAKLE | 79 | Lack of quantity | 14-31F | 26449 | ItemA | 3 | 1 | 2 | Solved |
| 2020-06-22 10:10:13 | shhwang | 65 | WAKLE | 79 | Unable to scan item barcode | 14-41A | 26449 | ItemA | 6 | 0 | 6 | Solved |

901 (Type of problem column)
903 (Quantity columns)

FIG. 10

Details of carrying-out from Coupang

| Loading number | Carrying-out number | Vendor name | Number of SKU types | Quantity |
|---|---|---|---|---|
| 20 | WAKLE | VendorA | 1 | 7 |

| Carrying-out number | Item barcode | Item name | Quantity |
|---|---|---|---|
| WAKLE | SKU0000010400 | ItemA | 7 |

Customer: VendorA
Customer ID: A00021458
Sending-back company: Coupang
Sending-back center: Oryu-Dong Seo-Gu, Incheon
Date of loading: 2020-06-16 12:09:51
Transportation number: 1040

Undertaking worker:

Print

FIG. 11

Details of carrying-out plan

| Carrying-out group number | External carrying-out number | Internal carrying-out number | Purchased or not | Virtually carried out or not | Date and time of generating carrying-out instruction | Deadline for carrying-out | Status | Number of SKU types | Unloaded problematic quantity | Requested carrying-out quantity | Assigned quantity of items to be collected | Quantity of items which have been collected | Quantity of items which have been carried out | Collection tote |
|---|---|---|---|---|---|---|---|---|---|---|---|---|---|---|
| 100 | WAKLE | 142 | Coupang item | Y | 2020-08-18 14:35:01 | 2020-09-02 00:00:00 | Waiting for allocation | 3 | 6 | 0 | 0 | 0 | 0 | - |

Information on carrying-out destination

| Vendor name | Carrying-out address | Carrying-out phone number | Means of transportation | Type of charge | Message |
|---|---|---|---|---|---|
| VendorA | - | - | Truck | Borne by Coupang | - |

Details of loading

| Loading number | Time of finishing loading | Car for loading work | Means of transportation | Vehicle license number/Invoice number | Carrying-out image | Signature of undertaking worker |
|---|---|---|---|---|---|---|
| No search result | | | | | | |

Carrying-out list

Processing status
| All | > | Q View |

| SKY ID | External SKU ID | Item name | Item barcode | Requested carrying-out quantity | Virtually carried-out quantity | Status | |
|---|---|---|---|---|---|---|---|
| 2 | 10053 | ItemC | 57020149594460 | 2 | 0 | Waiting for allocation | Virtual loading |
| 15 | 1000 | ItemD | 037000512257 | 2 | 0 | Waiting for allocation | Virtual loading |

| Item name | ItemC |
|---|---|
| Item barcode | 5702014959460 |
| Requested carrying-out quantity | 2 |
| Virtually loadable quantity | 2 (14-PRB0-1-12) |
| Virtually loaded quantity | 2 |

Virtual loading

Close    loading

ELECTRONIC APPARATUS FOR MANAGING CARRYING-OUT ON FULFILLMENT CENTER AND CONTROLLING METHOD THEREOF

BACKGROUND

Technical Field

The present disclosure relates to an electronic apparatus for managing carrying-out of items from a fulfillment center to vendors and a method of controlling the electronic apparatus.

Description of the Related Art

With the development of electronic technologies, e-commerce has become a field of shopping. Customers may purchase goods online without going to a shopping mall or market in person, and the goods purchased online are delivered to delivery destinations requested by the customers.

In such e-commerce, delivery speed of items considerably influences customers' service satisfaction. Accordingly, various methods are under discussion to rapidly deliver items to customers. As a method for such rapid delivery, fulfillment centers are prepared in various areas. Each fulfillment center stores a variety of items which are sold online, and when an item is purchased by a customer, the item is delivered to the customer from a fulfillment center close to the customer. In other words, before items are purchased, the items are placed in various areas, and when an item is purchased, the item is taken out of a fulfillment center close to the location of the customer and delivered so that a delivery period is shortened.

Meanwhile, in some cases, vendors may want to collect items temporarily stored in a fulfillment center to sell the items through a different channel than e-commerce. This case of returning items from a fulfillment center to vendors may be referred to as carrying-out.

SUMMARY

Technical Goals

The present disclosure is directed to providing an electronic apparatus for generating vendor-specific carrying-out information on the basis of carrying-out request information and causing carrying-out to be performed on the basis of the carrying-out information so that providing carrying-out information to vendors is facilitated and vendor-specific carrying-out item management is performed effectively, and a method of controlling the electronic apparatus.

Objects of the present disclosure are not limited to those described above, and other objects may be inferred from the following example embodiments.

Technical Solutions

According to a first example embodiment, there is provided a controlling method of controlling an electronic apparatus for managing carrying-out from a fulfillment center, the method including acquiring carrying-out request information related to items placed in the fulfillment center, generating pieces of carrying-out information according to vendors based on the acquired carrying-out request information, providing at least one of the pieces of generated carrying-out information to a terminal, receiving carrying-out processing response information from the terminal in response to the provided piece of carrying-out information, and generating state information of or regarding items corresponding to the carrying-out processing response information.

According to a second example embodiment, there is also provided a non-transitory computer-readable recording medium storing a program for a computer to perform a controlling method of an electronic apparatus for managing carrying-out from a fulfillment center, the controlling method including acquiring carrying-out request information related to items placed in the fulfillment center, generating pieces of carrying-out information according to vendors based on the acquired carrying-out request information, providing at least one of the pieces of generated carrying-out information to a terminal, receiving carrying-out processing response information from the terminal in response to the provided piece of carrying-out information, and generating state information of items corresponding to the carrying-out processing response information.

According to a third example embodiment, there is also provided an electronic apparatus for managing carrying-out from a fulfillment center, the electronic apparatus including a memory for storing instructions and a processor. The processor is connected to the memory to acquire carrying-out request information related to items placed in the fulfillment center, generate pieces of carrying-out information according to vendors based on the acquired carrying-out request information, provide at least one of the pieces of generated carrying-out information to a terminal, receive carrying-out processing response information from the terminal in response to the provided piece of carrying-out information, and generate state information of items corresponding to the carrying-out processing response information.

Details of other aspects are included in the Detailed Description and the accompanying drawings.

Effects

According to the present disclosure, an electronic apparatus for managing carrying-out from a fulfillment center and a method of controlling the electronic apparatus generate vendor-specific carrying-out information on the basis of carrying-out request information and cause carrying-out to be performed on the basis of the vendor-specific carrying-out information so that providing carrying-out information to vendors may be facilitated and vendor-specific carrying-out item management may be effectively performed.

Also, according to the present disclosure, information on carrying-out items is provided to vendors in real time in response to the carrying-out item information being identified, so that the carrying-out items can be effectively managed.

Effects of the present disclosure are not limited to those described above, and other effects which have not been described will be clearly understood by those of ordinary skill in the art from the claims.

BRIEF DESCRIPTION OF THE DRAWINGS

FIG. 3 is a diagram illustrating an example of carrying-out information of the electronic apparatus according to the example embodiment.

FIG. 4 is a diagram illustrating an example of state information of items generated by the electronic apparatus according to the example embodiment.

FIGS. 6 to 8 are diagrams illustrating carrying-out processing response information used in the electronic apparatus according to the example embodiment.

FIG. 9 is a diagram illustrating an example of information provided when an error related to a carrying-out item occurs in the electronic apparatus according to the example embodiment.

FIG. 10 is a diagram illustrating an example of information acquired by the electronic apparatus according to the example embodiment when loading of carrying-out items is finished.

FIGS. 11 and 12 are diagrams illustrating an example of updating pre-stored item quantity information on the basis of carrying-out processing response information in the electronic apparatus according to the example embodiment.

DETAILED DESCRIPTION

As terms used herein, general terms that are widely used are selected, when possible, in consideration of functions of the present disclosure, but the terms may vary according to intentions of those of ordinary skill in the art, precedents, advent of new technologies, and the like. Some terms may be arbitrarily chosen by the present applicant, and in this case, the meanings of these terms will be explained in the corresponding parts of description in detail. Accordingly, the terms used herein should be defined not on the basis of the names thereof be defined but on the basis of the meanings thereof and the whole context of the present disclosure.

Throughout the specification, it will be understood that when a part is referred to as "including" an element, the part does not preclude other elements and may further include other elements unless stated otherwise.

Throughout the specification, the expression "at least one of a, b, and c" indicates only a, only b, only c, both a and b, both a and c, both b and c, and all of a, b, and c.

As used herein, an "electronic apparatus" may be referred to as an "electronic device" and implemented as a computer or a portable terminal which may access a server or another electronic apparatus via a network. Here, the computer includes, for example, a notebook computer, a desktop computer, a laptop computer, etc., in which a web browser is installed, and the portable terminal is a wireless communication device with portability and mobility and may include all kinds of handheld-based wireless communication devices such as communication-based terminals, smart phones, and tablet personal computers (PCs) which support international mobile telecommunication (IMT)-2000, code division multiple access (CDMA), wideband CDMA (W-CDMA), long term evolution (LTE), etc.

Hereinafter, example embodiments of the present disclosure will be described in detail with reference to the accompanying drawings so that those of ordinary skill in the art may easily implement the present disclosure. However, the present disclosure may be implemented in various different forms and is not limited to the example embodiments set forth herein.

The example embodiments of the present disclosure will be described in detail below with reference to the drawings.

Figure 1:
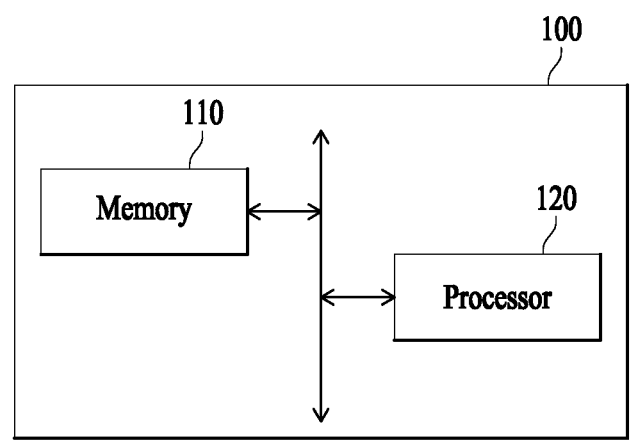
FIG. 1 is a functional block diagram of an electronic apparatus for managing carrying-out from a fulfillment center according to an example embodiment.

FIG. 1 is a functional block diagram of an electronic apparatus for managing carrying-out from a fulfillment center according to an example embodiment of the present disclosure. Elements related to the example embodiment are shown in FIG. 1. However, elements are not limited thereto, and general-use elements other than the elements shown in FIG. 1 may be further included.

Referring to FIG. 1, an electronic apparatus 100 may include a memory 110 and a processor 120. Each element shown in FIG. 1 means a unit for processing at least one function or operation and may be implemented as hardware, software, or a combination of hardware and software.

In some embodiments, the electronic apparatus 100 of FIG. 1 may be implemented as a server, a computer, or a terminal, and the specification is not limited by an implementation form of the electronic apparatus 100.

The memory 110 may store various types of data related to the electronic apparatus 100. For example, the memory 110 may store at least one instruction for operations of the electronic apparatus 100. In this case, the processor 120 which will be described below may perform various operations on the basis of the instruction stored in the memory 110.

In the example embodiment, the memory 110 may store information on or regarding items which are placed in a fulfillment center. For example, the memory 110 may store information on at least one of the quantity, name, incoming time, price, expiration date, arrangement location in the fulfillment center, and vendor name of items which are stocked in the fulfillment center. However, information stored in the memory 110 is not limited thereto, and various types of information related to items may be stored.

The processor 120 may control overall operation of the electronic apparatus 100. For example, the processor 120 may control operation of the electronic apparatus 100 by controlling elements of the electronic apparatus 100 on the basis of instructions stored in the memory 110.

The processor 120 may acquire carrying-out request information related to an item placed in the fulfillment center. When the carrying-out request information is received from another apparatus, the processor 120 may acquire the carrying-out request information. The carrying-out request information is information on at least one item to be carried out and may include at least one of the name of the carrying-out item, the vendor name of the carrying-out item, a carrying-out quantity, a deadline for carrying-out, whether the carrying-out item is purchased, and a charge for carrying-out.

The carrying-out request information may be generated by another apparatus and received by the electronic apparatus 100. However, a method of acquiring the carrying-out request information is not limited thereto, and the carrying-out request information may be acquired in various ways. As an example, the carrying-out request information may be acquired when generated by the electronic apparatus 100 on the basis of an input of a user. As another example, the carrying-out request information may be automatically generated on the basis of a placement period of items placed in the fulfillment center. For example, the carrying-out request information may be generated for items which are stored in the fulfillment center for a predesignated period or more. In this case, a period in which the items are stored in the fulfillment center may be calculated on the basis of a date when the items are stocked in the fulfillment center.

The processor 120 may generate carrying-out information according to vendors on the basis of the carrying-out request information. Specifically, when the carrying-out request information is acquired, the processor 120 may classify the carrying-out request information by vendor and generate vendor-specific carrying-out information. For example, when the carrying-out request information includes information for requesting carrying-out of items related to vendors A, B, and C, the processor 120 may classify the items to be carried out, which are included in the carrying-out request information, according to vendors A, B, and C and generate vendor-specific carrying-out information.

In the example embodiment, the processor 120 may generate vendor-specific carrying-out information on the basis of placement locations of items in the fulfillment center. Specifically, the processor 120 may classify the items to be carried out by vendor, group the items to be carried out according to locations of the items to be carried out in the fulfillment center, and generate carrying-out information including the group information.

For example, the processor 120 may generate first carrying-out information and second carrying-out information related to vendor A. All items corresponding to the first carrying-out information and the second carrying-out information may be items of vendor A. The location of at least one item corresponding to the first carrying-out information may differ from the location of at least one item corresponding to the second carrying-out information. In some cases, the location of some of the at least one item corresponding to the first carrying-out information may differ from the location of other items. However, the items may be positioned within a specific range from the other items so that a worker may pick (or collect) the items to be carried out without special difficulty. Meanwhile, the item corresponding to the second carrying-out information may be placed at a location more than a specific distance away from the item corresponding to the first carrying-out information.

When a plurality of pieces of carrying-out information of different locations are generated in relation to vendor A as described above, the pieces of carrying-out information may be provided to terminals of different workers. For example, the first carrying-out information may be provided to a first terminal at a location related to the first carrying-out information, and the second carrying-out information may be provided to a second terminal at a location related to the second carrying-out information. Accordingly, picking may be efficiently performed.

In the example embodiment, carrying-out information may be generated according to a type of contract with a vendor predesignated in relation to carrying-out items. For example, when first items of vendor A stored in the fulfillment center correspond to a first type which is purchased and stored in the fulfillment center and second items of vendor A correspond to a second type which is simply stored in the fulfillment center, carrying-out information may be generated to reflect types of contracts on items according to vendors. In this case, first carrying-out information of vendor A may include carrying-out information of the first type of items, and second carrying-out information of vendor A may include carrying-out information of the second type of items.

The processor 120 may provide at least one of the pieces of carrying-out information to a terminal. As an example, the processor 120 may provide carrying-out information of vendor A among the pieces of generated vendor-specific carrying-out information to a first terminal. In this case, the first terminal may be a terminal of a worker who will pick items of vendor A to be carried out. As another example, the processor 120 may provide all the pieces of generated vendor-specific carrying-out information to a first terminal.

In this case, a user of the first terminal may select and identify carrying-out information of a vendor, for example, carrying-out information of vendor A, for which a work will be performed from among the provided pieces of information.

The processor 120 may receive carrying-out processing response information from a terminal. Specifically, the processor 120 may provide at least one of the pieces of vendor-specific carrying-out information and receive carrying-out processing response information corresponding to the provided carrying-out information. The carrying-out processing response information may include information related to carrying-out processing of items corresponding to the carrying-out information provided to the terminal. For example, the carrying-out processing response information may include at least one of quantity information of carried-out items, image information of the carried-out items, information on a person in charge of carrying-out processing, and status information of carrying-out processing.

Here, the quantity information of the carried-out items may include the number of items which are actually carried out of the fulfillment center. In some cases, a smaller number of items than indicated by carrying-out request information may be placed in the fulfillment center. In this case, the quantity information of carried-out items may include information on the quantity smaller than indicated by the carrying-out request information.

The image information of the carried-out items may include image information acquired in a carrying-out processing situation when carrying-out processing is performed on the basis of provision of the carrying-out information. For example, when the carrying-out information is provided in a picking operation and the carrying-out items are picked, the image information of the carried-out items may include image information showing items picked and put in a tote. Such an image may be an image acquired by a terminal but is not limited thereto. When the carrying-out information is provided in a loading operation and the carrying-out items are loaded, the image information of the carried-out items may include image information showing the items loaded on a truck. When the items are transported to the vendor through a delivery service, the image information of the carried-out items may include image information showing at least one of invoice information and a truck with the items. Here, the loading operation is an operation immediately before an operation of delivering the items to a vendor and may include an operation of loading the items on a truck which will transport the items.

The information on a person in charge of carrying-out processing may include information on a worker who possesses the terminal to which the carrying-out information is provided. In some cases, the terminal may not correspond to the worker. In this case, the person-in-charge information may include information indicating an actual worker who performs a work corresponding to the carrying-out information, but the person-in-charge information is not limited thereto.

The processor 120 may generate state information of items corresponding to the carrying-out processing response information. When the carrying-out processing response information is received, the processor 120 may generate state information indicating a carrying-out state of the items corresponding to the carrying-out processing response information. For example, the state information may include information on at least one of a remaining quantity of items to be carried out, a requested carrying-out quantity, a quantity of items which have been carried out, a carrying-out processing stage, an item quantity error, and a virtual carrying-out quantity.

In the example embodiment, when the carrying-out processing response information is acquired, the processor 120 may update quantity information of items pre-stored in the electronic apparatus 100 on the basis of quantity information of carried out items. For example, when the carrying-out processing response information is acquired, the processor 120 may update quantity information of items remaining in the fulfillment center by subtracting the quantity of carried out items from the quantity of pre-stored items.

Meanwhile, in some cases, an item quantity corresponding to carrying-out request information may exceed a pre-stored item quantity. For example, while the carrying-out request information may include information requesting that 30 A-items be carry out, pre-stored quantity information of A-items may be 27. This situation may result from an error in the item quantity of pre-stored in the electronic apparatus 100. In this situation, according to an example embodiment, the processor 120 may identify a quantity error of the items corresponding to the provided carrying-out information on the basis of the carrying-out request information and the carrying-out processing response information. The processor 120 may generate state information of the items on the basis of the identified item quantity error. For example, when the quantity error of A-items is identified to be 3, the processor 120 may generate item quantity error information of A-items as 3.

In the example embodiment, the processor 120 may adjust a pre-stored quantity of items or a quantity of items corresponding to the carrying-out request information. For example, the processor 120 may acquire information on a quantity to be increased or reduced and adjust the pre-stored quantity of items or the quantity of items corresponding to the carrying-out request information according to the acquired quantity information. As an example, when a quantity of first items to be input to a virtual loading entry is two, the processor 120 may reduce a quantity of first items pre-stored in the electronic apparatus 100 by two or reduce a requested carrying-out quantity corresponding to first items by two. As another example, when a quantity of first items to be input to a virtual loading entry is two, the processor 120 may process two of the first items as having been loaded though the two of the first items have not been actually loaded. Specific relevant examples are shown in FIGS. 11 and 12.

In the example embodiment, the processor 120 may pick items using at least one piece of carrying-out information provided to a terminal. In some cases, the terminal may be disposed at a location predesignated in the fulfillment center to manage items to be stored in or taken out of a specific area. In this case, when carrying-out information is provided to the terminal, the terminal may pick items corresponding to the provided carrying-out information. The items may be picked in various ways, for example, using a robot or a conveyor, but a method of picking items is not limited thereto. When items are picked using a robot or a conveyor, the terminal may control a picking operation through a connection with the robot or the conveyor.

In some cases, when the terminal is a device possessed by a worker, the carrying-out information may be provided to the terminal so that the worker may be requested to pick items corresponding to the carrying-out information.

In the example embodiment, the picked items may be put in totes. For example, the totes may be crates in which items indicated by the carrying-out information to be carried out are picked and put, and the picked items may be put in the totes through the conveyor or the robot. When the picked items are put in the totes, the terminal may generate information on the items put in the totes and map the generated information to each of the totes. For example, the terminal may cause a barcode representing information on the items put in the totes to be attached to the totes.

In the example embodiment, when the carrying-out information is provided to the terminal, the worker may pick items corresponding to the carrying-out information in the fulfillment center and put the items in totes. In this case, items of the same vendor may be put in one tote. After putting the items in totes, the worker may output barcodes of the items put in the totes through the terminal and attach the barcodes to the totes.

In the example embodiment, the processor 120 may identify a tote related to a picked item. For example, when a barcode attached to a tote is recognized through the terminal, the processor 120 may identify the tote related to a picked item. In some cases, totes may be classified by vendor, that is, items of one vendor are put in one tote. In this case, the identified tote may correspond to a specific vendor.

In the example embodiment, the processor 120 may identify carrying-out item information corresponding to the identified tote. The carrying-out item information corresponding to the tote may include information on at least one of a quantity, name, and vendor of items put in the tote.

In the example embodiment, when the carrying-out item information is identified, the processor 120 may transmit the carrying-out item information to an electronic apparatus for the vendor corresponding to the carrying-out item information. The electronic apparatus 100 may store information on an electronic apparatus corresponding to each vendor, and when the carrying-out item information is identified, the processor 120 may transmit the carrying-out item information to the electronic apparatus for the vendor corresponding to the carrying-out item information. In this case, the vendor can know the state of carrying-out items in real time so that the carrying-out items can be managed more effectively.

In the example embodiment, when the carrying-out item information is identified, the processor 120 may generate payment information related to the carrying-out item information. For example, when the carrying-out items represented by the carrying-out item information have been carried out, the processor 120 may generate payment information of the carrying-out items. The processor 120 may cause a payment to be made to the vendor corresponding to the carrying-out items on the basis of the generated payment information. The payment information may include information on the amount of money to be paid when carrying-out is finished. In this case, the payment is finished in real time according to a carrying-out state, and thus it is possible to remove inconvenience of time required for payment.

In the example embodiment, the processor 120 may identify information on items which are stocked back to the fulfillment center. The processor 120 may generate additional carrying-out information of at least one of items being stocked back based on the identified item information and state information corresponding to the identified item information.

Specifically, the processor 120 may identify information on an item which is stocked back to the fulfillment center by a customer who gets a refund. When the stock-back item is identified, the processor 120 may identify state information of the identified item. Here, the state information being identified may be related to at least one of whether there is a carrying-out request for an item identical to the stock-back item, to which stage a carrying-out process caused by the carrying-out request has been performed, and whether there is a difference between a requested carrying-out quantity and a quantity of items which are actually carried out.

The processor 120 may generate additional carrying-out information of at least one of the stock-back items on the basis of the identified state information.

In the example embodiment, the processor 120 may identify whether the state information of the item corresponding to the identified item information includes first state information. When a carrying-out state of the item includes the first state information, the processor 120 may generate additional carrying-out information regarding the identified item information. The first state information may correspond to, for example, a time before the finish of carrying-out and may include information indicating that a quantity of items actually carried out does not reach to a requested carrying-out quantity. The time before the finish of carrying-out may include a situation before the item to be carried out is delivered to a vendor.

As a specific example, when the identified state information corresponds to a time before the finish of carrying-out and includes information indicating that a quantity of items actually carried out does not reach to a requested carrying-out quantity, the processor 120 may generate additional carrying-out information of at least one of items being stocked back. The generated additional carrying-out information may be about a quantity of items to be additionally carried out in order to satisfy the requested carrying-out quantity among the total quantity of items being stocked back. For example, when there are two items being stocked back, one item may be additionally required for the requested carrying-out quantity. In this case, additional carrying-out quantity may be about one item being stocked back.

Figure 2:
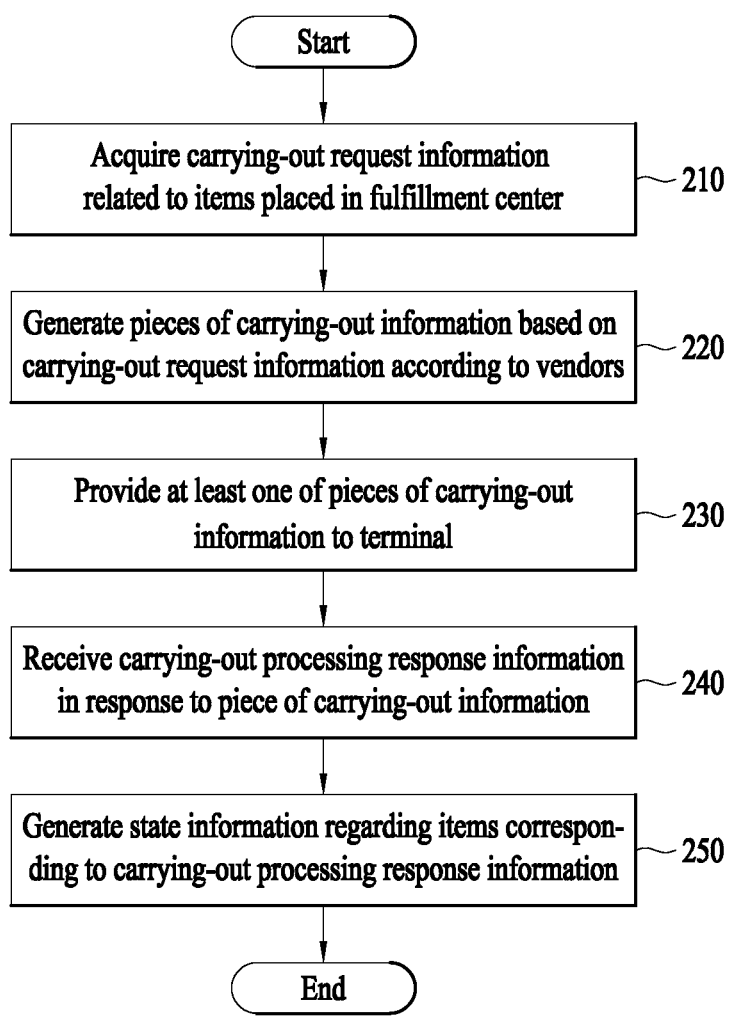
FIG. 2 is a flowchart of a method of controlling an electronic apparatus according to an example embodiment.

FIG. 2 is a flowchart of a method of controlling an electronic apparatus according to an example embodiment of the present disclosure. Operations of the method shown in FIG. 2 may be performed in a different order than shown in the drawing. Description may be omitted when overlapping that of FIG. 1.

Referring to FIG. 2, in operation 210, the electronic apparatus may acquire carrying-out request information related to items placed in a fulfillment center. The carrying-out request information may be information on items to be returned to vendors which have provided the items among items placed in the fulfillment center and may include information on at least one of the name of the items to be carried out, a quantity of the items to be carried out, and a deadline for carrying out the items to be carried out.

In the example embodiment, the carrying-out request information may be acquired by the electronic apparatus when transmitted from another apparatus. However, a method of acquiring the carrying-out request information is not limited thereto, and the carrying-out request information may be generated by the electronic apparatus on the basis of an input of a user.

In an operation 220, the electronic apparatus may generate carrying-out information according to vendors on the basis of the carrying-out request information. When the carrying-out request information is acquired, the electronic apparatus may classify carrying-out items by vendor and generate vendor-specific carrying-out information. In some cases, the electronic apparatus may classify vendor-specific carrying-out information on the basis of the locations of items. For example, when items of a first vendor to be carried out are classified and placed at two locations, the electronic apparatus may generate first carrying-out information and second carrying-out information as carrying-out information of the first vendor. When the locations of items are a specific distance or more apart, different pieces of carrying-out information are generated.

In operation 230, the electronic apparatus may provide at least one piece of the carrying-out information to a terminal. Here, the terminal may include one terminal selected from among a plurality of terminals but is not limited thereto.

In the example embodiment, carrying-out information may be generated according to each carrying-out operation. For example, carrying-out information may be generated regarding first items of a first vendor according to each of a picking operation and a loading operation. In this case, carrying-out information of the picking operation may be provided to a first terminal, and carrying-out information of the loading operation may be provided to a second terminal.

In operation 240, the electronic apparatus may receive carrying-out processing response information in response to the carrying-out information. The carrying-out processing response information may be generated by the terminal. For example, when the carrying-out information includes information requesting that n first items be picked, the carrying-out processing response information may include information on a quantity of items which have been picked and an image representing that picking has been finished.

In operation 250, the electronic apparatus may generate state information of the items corresponding to the carrying-out processing response information. The electronic apparatus may generate state information of items according to a carrying-out state represented by the carrying-out processing response information. For example, when the carrying-out processing response information includes information indicating that picking of k first items has been finished, the electronic apparatus may generate state information representing that k first items have been picked.

FIG. 3 is a diagram illustrating an example of carrying-out information of the electronic apparatus according to an example embodiment of the present disclosure. Specifically, FIG. 3 shows an example of displaying carrying-out information classified by vendor.

As shown in FIG. 3, carrying-out information 311 may be classified by vendor. For example, the carrying-out information 311 may include information on a carrying-out instruction generation date and time which represent a date and time when carrying-out request information is acquired, a carrying-out end date and time which represent a deadline for carrying-out, a vendor name corresponding to an item to be carried out, and a requested carrying-out quantity.

State information 313 of items may be displayed in the electronic apparatus. As shown in the drawing, the state information 313 of items may be displayed in relation to the carrying-out information 311, that is, in a format corresponding to the carrying-out information 311, but a format of the state information 313 is not limited thereto.

In the example embodiment, since carrying-out information is classified by vendor, a carrying-out group number, an external carrying-out number, and an internal carrying-out number for managing vendor-specific carrying-out information may be given to the carrying-out information, but numbers given to carrying-out information are not limited thereto.

For example, the state information 313 may include information on item-specific carrying-out states (e.g., the finish of carrying-out or the finish of preparation of loading) of a current time point, a finished collection quantity representing a quantity of items which have been picked, a finished carrying-out quantity representing a quantity of items loaded on a truck and delivered to a vendor, and an unloaded problematic quantity representing a difference between a requested carrying-out quantity and a quantity of items actually carried out. The state information 313 may be provided in more specific forms according to embodiments, and such examples are shown in FIG. 4.

In the example embodiment, a plurality of types of items may be placed in a fulfillment center according to contracts with vendors. For example, a first type may correspond to a case of simply storing items in a fulfillment center without paying a vendor for the items, and a second type may correspond to a case of storing items in a fulfillment center after paying a vendor a purchasing price and receiving back the purchasing price when the items are returned. The electronic apparatus may store information on such types of items, and type-specific payments may be made according to return situations. For example, a payment for first type items may be made without any actual cash transaction, and a payment for second type items may be made on the basis of an actual cash transaction. Meanwhile, such a payment may be made when carrying-out processing response information is identified. This has been described above, and the detailed description thereof will be omitted.

FIG. 4 is a diagram illustrating an example of state information of items generated by the electronic apparatus according to an example embodiment of the present disclosure. Specifically, FIG. 4 shows an example of state information shown in a specific format.

Referring to FIG. 4, state information may include information on a date and time of finishing item collection (or picking), a quantity of collected items, a container barcode representing a container in which a tote containing items is placed when item collection is performed, a date and time of finishing loading representing a time point of finishing loading, and a vehicle license number/an invoice number corresponding to information on a vehicle on which loading is performed.

In the example embodiment, identical items may have different pieces of carrying-out information. In this case, state information may be separately shown according to the pieces of carrying-out information.

Figure 5:
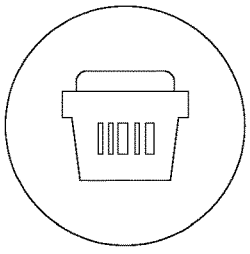
FIG. 5 is a set of diagrams illustrating examples of a screen provided to a terminal when information is transmitted from the electronic apparatus according to the example embodiment to the terminal.

FIG. 5 is a set of diagrams illustrating examples of a screen provided to a terminal when information is transmitted from the electronic apparatus to the terminal according to an example embodiment of the present disclosure.

In FIG. 5, reference numeral 510 shows an example of a screen which is provided to a terminal when a worker of the terminal performs a picking work for carrying-out on the basis of transmission of carrying-out information to the terminal. According to the reference numeral 510, before picking for carrying-out is started, the terminal may provide information for requesting to recognize a tote in which items will be put.

When the tote is recognized, the terminal may request information on a location in which items will be picked as indicated by reference numeral 520. According to an input of a user, a location in which the items will be picked, for example, 14B, may be confirmed. In some cases, a plurality of items may be placed on a plurality of aisles in one location, for example, 14B. In this case, information on an aisle on which the items to be picked are placed may be requested as indicated by reference numeral 530.

The aisle, for example, 15 on which the items to be picked are placed may be selected by a selection of the user. In this case, information for requesting recognition of a barcode provided according to the aisle may be displayed as indicated by reference numeral 540.

Figure 6:
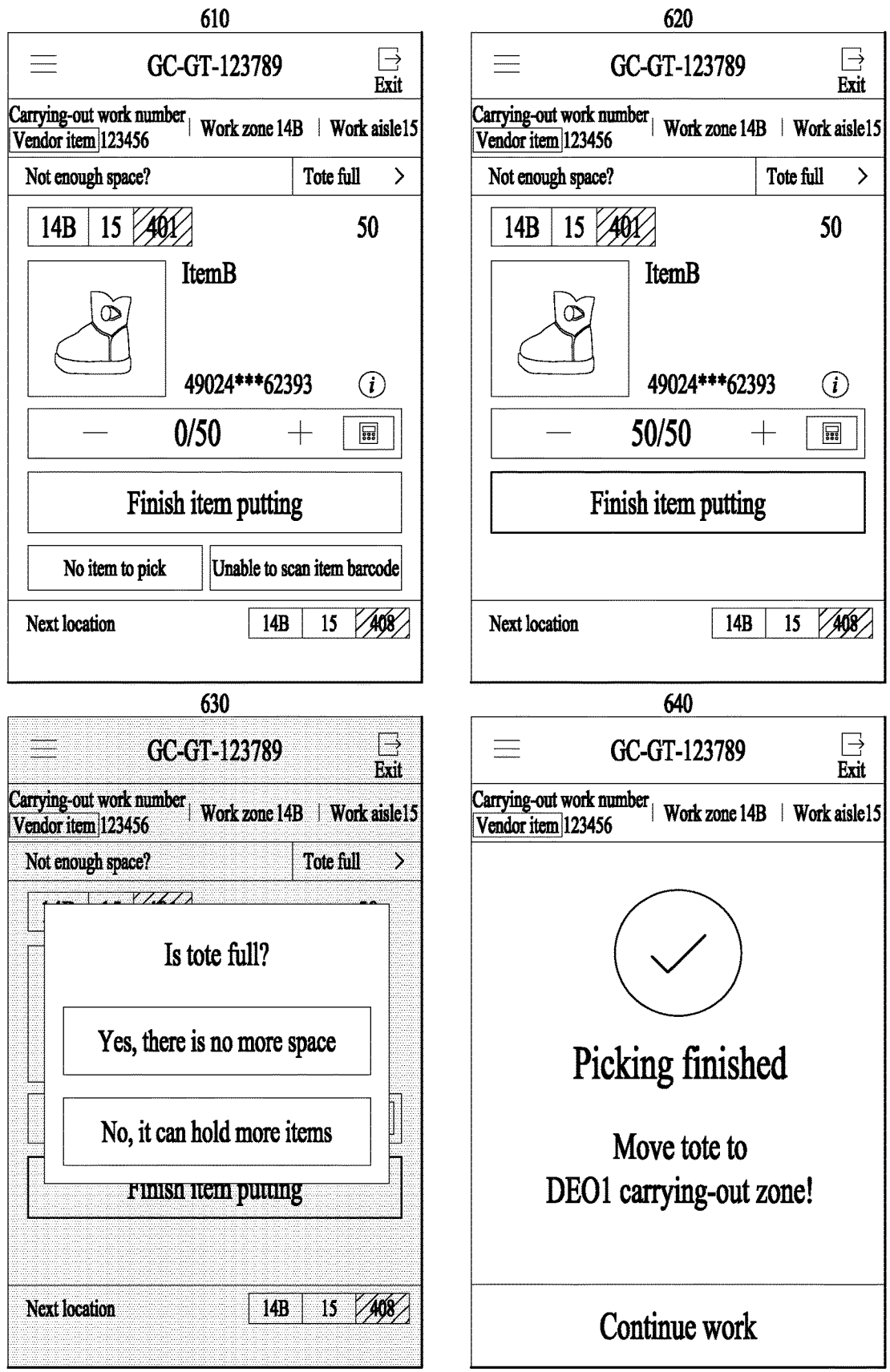
Figure 7:
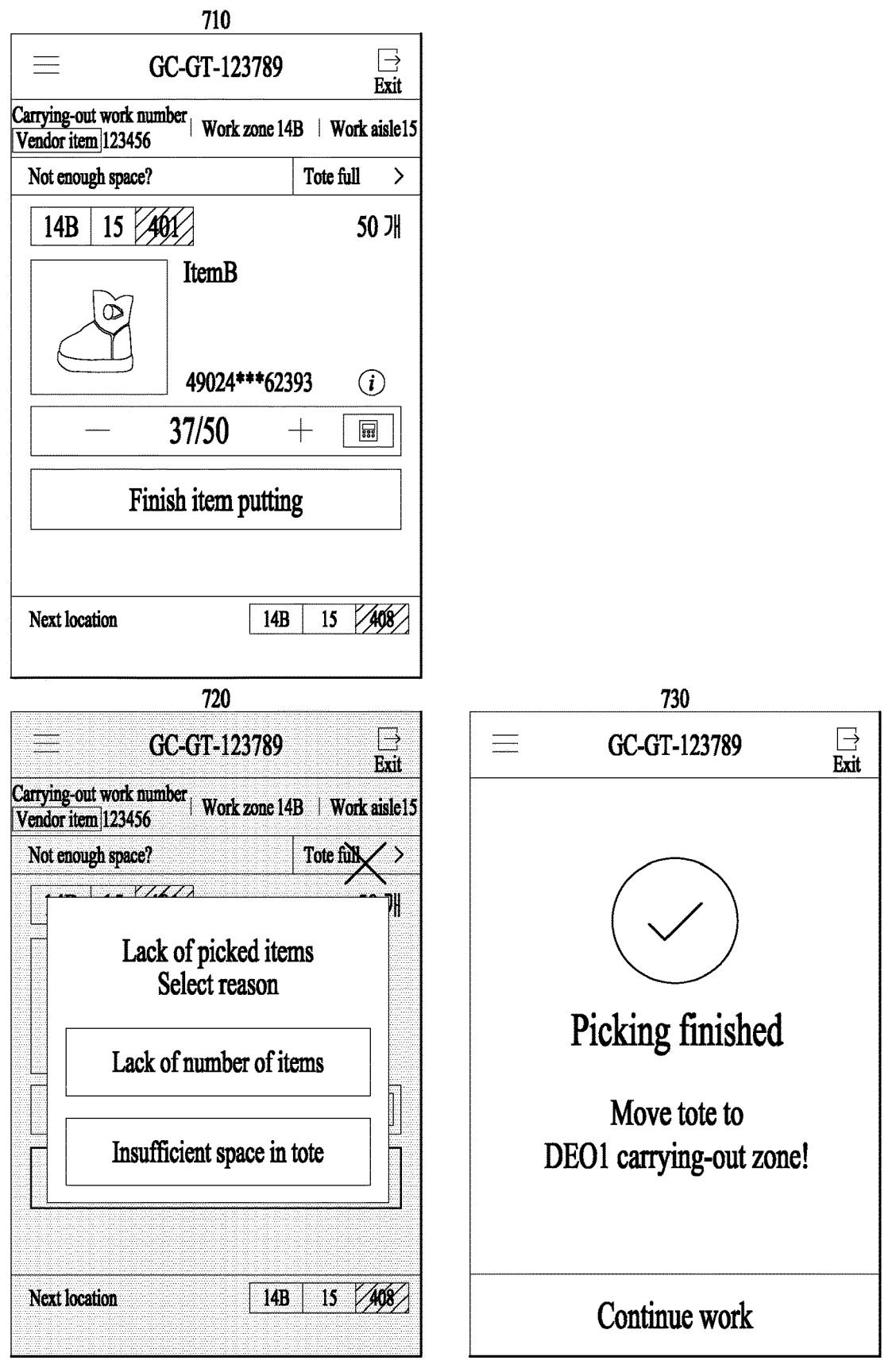
Figure 8:
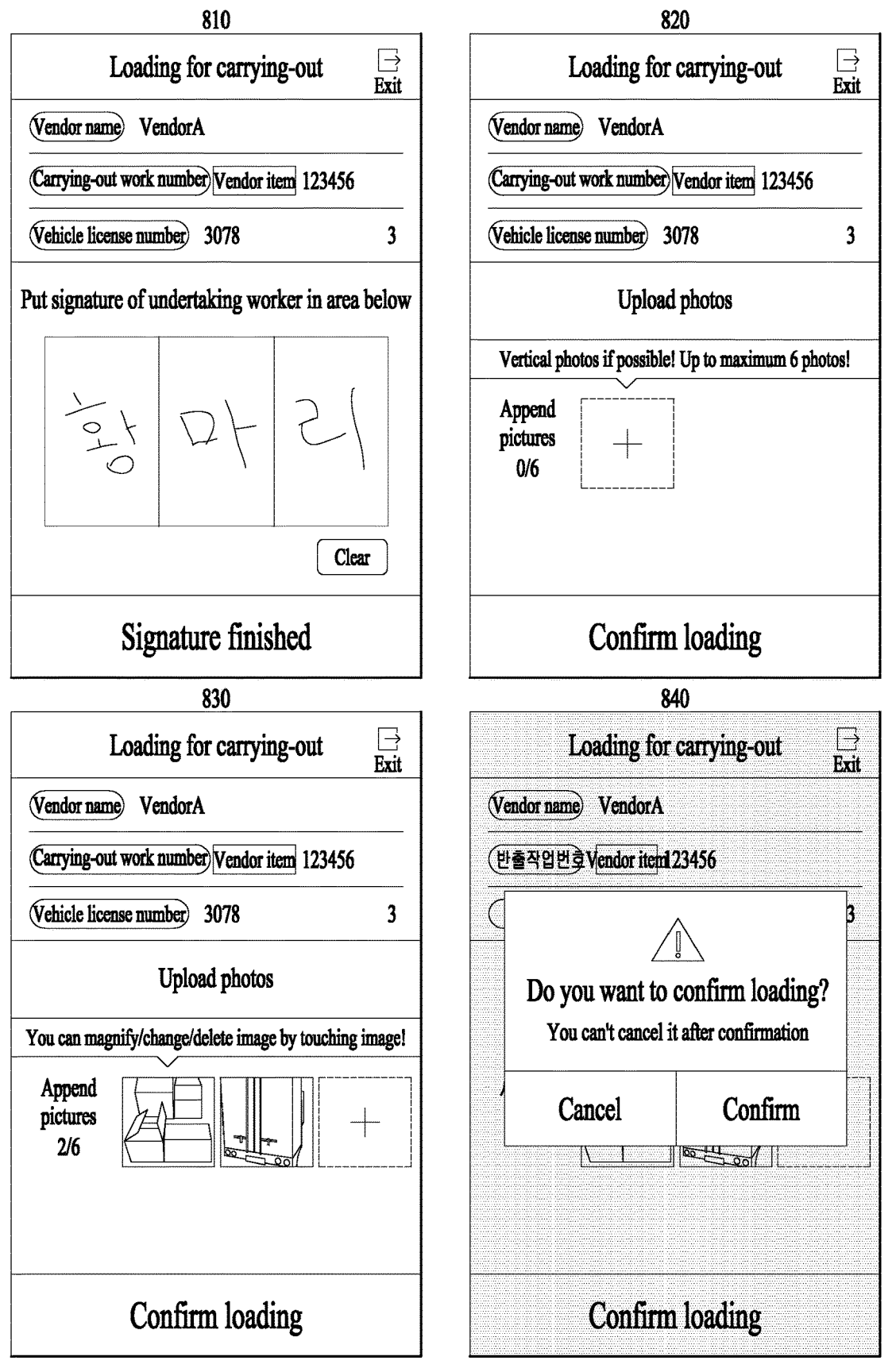

FIGS. 6 to 8 are diagrams illustrating carrying-out processing response information used in the electronic apparatus according to an example embodiment of the present disclosure.

Specifically, FIG. 6 shows examples of a screen displayed when a location in which items will be picked is settled.

For example, when a location in which items will be picked is settled as shown in FIG. 5, information on the items placed in the location may be displayed on the terminal as indicated by reference numeral 610. When the items are put in the tote, information on a quantity of the items put in the tote may be input by the user of the terminal, and a screen may be displayed on the terminal as indicated by reference numeral 620. When putting the items in the tote is finished, an input may be made on the button "finish of item putting."

In the example embodiment, items put in a tote may correspond to the same vendor. Then, items are managed according to totes so that carrying-out may be performed more effectively.

In this case, a screen for identifying a loading state of the tote may be displayed as indicated by reference numeral 630. When an input on a button representing that the tote is full, for example, "Yes, there is no more space." is received, a screen may be displayed on the terminal as indicated by reference numeral 640. When the input is received as indicated by the reference numeral 630, the terminal may generate and transmit carrying-out processing response information to the electronic apparatus. The carrying-out processing response information may include, for example, information on the names of items which have been picked, a date and time of finishing picking, and a quantity of the picked items. A screen may be displayed on the terminal as indicated by the reference numeral 640.

FIG. 7 shows examples of a screen displayed on a terminal when there is a difference between a requested carrying-out quantity and a quantity of items actually carried out.

A screen indicated by reference numeral 710 of FIG. 7 may be similar to the screen indicated by the reference numeral 620 of FIG. 6. For example, the screen indicated by the reference numeral 710 may request an input of a quantity of picked items. However, in some cases, a quantity of items requested to be carried out may differ from a quantity of items actually placed in the fulfillment center. For example, while 50 items are requested to be carried out, 37 items may be actually placed in the fulfillment center. Then, the terminal may receive an input representing that there are 37 items, for example, an input on a button representing the finish of item putting after an input of the 37 items.

In this case, a screen for requesting to input a reason for the insufficient quantity of picked items may be displayed as indicated by reference numeral 720, and carrying-out processing response information may be generated on the basis of an input corresponding to the request. For example, when the input "lack of item quantity" is received as a reason for the insufficient quantity of picked items, carrying-out processing response information may be generated to include information on the insufficient quantity and information on a quantity of items which have been subjected to a carrying-out process, that is, items which have been picked. The generated carrying-out processing response information may be transmitted from the terminal to the electronic apparatus. A screen may be displayed on the terminal as indicated by reference numeral 730.

FIG. 8 shows examples of a screen displayed on a terminal when a loading work is performed.

An example of inputting person-in-charge information after the finish of a loading work is indicated by reference numeral 810 of FIG. 8. Specifically, the items to be carried out may be moved to a truck so as to be transported to the vendor. In other words, in the final stage of the transport from the fulfillment center to the vendor, the items to be carried out may be taken over by a driver of the truck. In this case, a screen for inputting a signature of a person-in-charge, who is the truck driver, may be displayed on the terminal as indicated by reference numeral 810.

In some cases, the carrying-out processing response information may include image information. For example, in the loading operation, the carrying-out processing response information may include image information of the items moved to the truck, image information of the truck, and image information of an invoice of a case in which the items are transported by a delivery service company. In this case, a screen for requesting image information to be included in the carrying-out processing response information may be provided to the terminal as indicated by reference numeral 820.

When image information is uploaded, a screen may be displayed on the terminal as indicated by reference numeral 830. When the loading operation is finished, a screen for requesting an input representing that loading has been finished may be displayed as indicated by reference numeral 840, and an input of finishing loading, for example, an input of "Confirm" may be received. When the input is received, the terminal may generate information of finished loading, include the generated information in the carrying-out processing response information, and transmit the carrying-out processing response information to the electronic apparatus.

FIG. 9 is a diagram illustrating an example of information provided when an error related to a carrying-out item occurs in the electronic apparatus according to an example embodiment of the present disclosure.

Specifically, FIG. 9 shows an example of a screen displayed on the electronic apparatus when there is a difference between a quantity of items in carrying-out request information and a quantity of items actually carried out.

The electronic apparatus may receive carrying-out processing response information from the terminal through the process illustrated in FIGS. 5 to 8. The received carrying-out processing response information represents information on items which have been actually carried out. In some cases, carrying-out processing response information may differ from carrying-out information. This situation may result from various reasons. For example, the reasons may include an error in an item quantity previously stored in the electronic apparatus and an error in information input by the terminal.

In this case, information representing a reason of an error may be displayed as a type of problem 901 as shown in FIG. 9. The information representing a reason of an error may include, for example, insufficiency of quantity and being unable to scan an item barcode but is not limited thereto. Also, information 903 may be displayed regarding a difference between carrying-out processing response information and carrying-out information.

FIG. 10 is a diagram illustrating an example of information acquired by the electronic apparatus according to an example embodiment of the present disclosure when loading of carrying-out items is finished.

Referring to FIG. 10, when loading of carrying-out items is finished, information on the person-in-charge who takes over the carrying-out items and information on the carrying-out items may be provided through one page. Such a page may be used as a carrying-out confirmation.

In the example embodiment, information shown in FIG. 10 may be transmitted to an electronic apparatus of the vendor, and thus the vendor may identify that loading has been finished and the carrying-out items are being moved from the fulfillment center to the vendor.

Meanwhile, the loading operation may correspond to an operation of loading the carrying-out items on a truck. In some cases, the loading operation may be referred to as another term, for example, a delivery operation, but is not limited thereto.

FIGS. 11 and 12 are diagrams illustrating an example of updating pre-stored item quantity information on the basis of carrying-out processing response information in the electronic apparatus according to an example embodiment of the present disclosure.

FIG. 11 shows an example of a screen displayed on the electronic apparatus when there is a difference between an item quantity of carrying-out information and an item quantity of carrying-out processing response information on the basis of a difference between an item quantity pre-stored in the electronic apparatus and a quantity of items actually placed in the fulfillment center.

Referring to FIG. 11, a virtual loading button 1101 may be displayed on the screen of the electronic apparatus. Virtual loading may be a function for matching an actual quantity of items and an item quantity pre-stored in the electronic apparatus to each other. When an input on a virtual loading button 1101 of FIG. 11 is received, a screen for adjusting an item quantity pre-stored in the electronic apparatus may be displayed on the electronic apparatus. An example of the screen is shown in FIG. 12.

Specifically, FIG. 12 shows a screen which is displayed when an input on a virtual loading button corresponding to item C is received.

Referring to FIG. 12, a quantity of items which may be adjusted through virtual loading may be a requested carrying-out quantity or less, and such information may be displayed. A quantity of items which will be assumed as having been loaded may be input to the blank of "Virtually loaded quantity" in text format.

In the example embodiment, when a requested carrying-out quantity is two and "2" is input as a virtually loaded quantity as shown in FIG. 12, the pre-stored item quantity may be updated to indicate that all carrying-out items have been carried out. However, the present disclosure is not limited to this case, and data may be adjusted so that the requested carrying-out quantity may be reduced by a quantity which is input as a virtually loaded quantity.

The electronic apparatus according to the above-described embodiment may include a processor, a memory which stores and executes program data, a permanent storage such as a disk drive, a communication port which communicates with an external device, a user interface such as a touch panel, keys, and buttons, and the like. Methods realized as software modules or algorithms may be stored as computer-readable codes or program commands, which can be executed by the processor, in a computer-readable recording medium. Examples of the computer-readable recording medium include magnetic storage media (e.g., a read-only memory (ROM), a random-access memory (RAM), a floppy disk, and a hard disk), optical reading media (e.g., a compact disk (CD)-ROM and a digital versatile disk (DVD)), and the like. The computer-readable recording medium can also be distributed over computer systems connected via a network so that the computer-readable codes are stored and executed in a distributed manner. The computer-readable recording medium may be read by a computer, stored in the memory, and executed by the processor.

The embodiments of the present disclosure may be realized as functional blocks and various processing operations. The functional blocks may be realized as a plurality of hardware and/or software elements which execute specific functions. For example, the embodiments may employ integrated circuits including a memory, processing, a logic, a look-up table, etc. which are used to execute various functions through control of one or more microprocessors or other control devices. While elements of the embodiments may be executed by software programming or software elements, the embodiments may be realized in programming or scripting languages including C, C++, Java, assembler, etc. to include various algorithms which are realized as combinations of data structures, processes, routines, or other programming elements. Functional aspects may be realized using algorithms which are executed by one or more processors. Also, the embodiments may employ conventional techniques for electronic environment setting, signal processing, data processing, and/or the like. The terms such as "mechanism," "element," "means," and "structure" may be widely used and are not limited to mechanical and physical composition. The terms may include the meanings of a series of routines of software in connection to a processor and the like.

The above-described embodiments are only exemplary, and other embodiments may be implemented in the scope of the following claims.

What is claimed is:

1. A method of controlling an electronic apparatus for managing carrying-out from a fulfillment center, the electronic apparatus comprising a processor and a memory including instructions that, when executed by the processor, cause the processor to perform the method comprising:
   acquiring carrying-out request information related to a plurality of items placed in the fulfillment center, the carrying-out request information comprising information identifying the items within the fulfillment center to be returned to a plurality of vendors that have provided the items to the fulfillment center prior to delivery to a customer;
   determining placement locations of the items;
   grouping the items according to the placement locations;
   automatically generating pieces of carrying-out information according to the plurality of vendors based on: i) the acquired carrying-out request information and ii) one or more item groups generated by the grouping of the items;
   providing at least one of the pieces of carrying-out information to a terminal;
   receiving carrying-out processing response information from the terminal in response to the provided piece of carrying-out information;
   comparing a requested quantity of the items to be carried out with a quantity of carried-out items, wherein the requested quantity is included in the carrying-out request information and the quantity of carried-out items is included in the carrying-out processing response information; and
   based on the comparison, generating state information regarding the items corresponding to the carrying-out processing response information, the state information indicative of carrying-out states of the items corresponding to the carrying-out processing response information,
   wherein the automatically generating the pieces of carrying-out information comprises:
   generating, per each of the plurality of vendors, one or more pieces of carrying-out information, wherein each of the one or more pieces of carrying-out information is related to a different item group.

2. The controlling method of claim 1, further comprising:
   picking the items using at least one piece of carrying-out information provided to the terminal; and
   identifying a tote related to the picked items,
   wherein the tote corresponds to a specific one of the vendors.

3. The controlling method of claim 2, further comprising:
   identifying carrying-out item information corresponding to the identified tote.

4. The controlling method of claim 3, further comprising:
   transmitting the carrying-out item information to an electronic apparatus of the vendor corresponding to the carrying-out item information when the carrying-out item information is identified.

5. The controlling method of claim 3, further comprising:
   generating payment information related to the carrying-out item information when the carrying-out item information is identified.

6. The controlling method of claim 1, further comprising:
   identifying information on items which are stocked back to the fulfillment center; and
   generating additional carrying-out information of at least one of the stock-back items based on the identified item information and state information corresponding to the identified item information.

7. The controlling method of claim 6, wherein the generating of the additional carrying-out information comprises:
   determining whether the state information of the items corresponding to the identified item information includes first state information; and
   generating the additional carrying-out information regarding the identified item information when a carrying-out state of the items includes the first state information.

8. The controlling method of claim 1, wherein the generating of the state information of the items comprises:
   identifying a quantity error of the items corresponding to the provided piece of carrying-out information based on the carrying-out request information and the carrying-out processing response information; and
   generating the state information of the items based on the identified quantity error of the items.

9. The controlling method of claim 1, wherein the carrying-out processing response information includes at least one of: image information of the carried-out items, information on a person in charge of carrying-out processing, and status information of the carrying-out processing.

10. The controlling method of claim 1, wherein the generating of the state information of the items comprises updating item quantity information pre-stored in the electronic apparatus based on the quantity information of carried-out items when the carrying-out processing response information is acquired.

11. The controlling method of claim 1, wherein the carrying-out request information includes information regarding at least one of: a name of carrying-out items, a vendor name of the carrying-out items, a deadline for carrying-out, whether the carrying-out items are purchased, or a charge for carrying-out.

12. The controlling method of claim 1, wherein the state information of the items includes information on at least one of: a remaining quantity of items to be carried out, a requested carrying-out quantity, a finished carrying-out quantity, a carrying-out processing stage, an item quantity error, or a virtual carrying-out quantity.

13. A non-transitory computer-readable recording medium storing a program for executing the controlling method of claim 1 in a computer.

14. An electronic apparatus for managing carrying-out from a fulfillment center, the electronic apparatus comprising:
  a memory configured to store instructions; and
  a processor,
  wherein the processor is connected to the memory and configured to:
    acquire carrying-out request information related to a plurality of items placed in the fulfillment center, the carrying-out request information comprising information identifying the items within the fulfillment center to be returned to a plurality of vendors from the fulfillment center prior to delivery to a customer;
    determine placement locations of the items;
    group the items according to the placement locations;
    automatically generate pieces of carrying-out information according to the plurality of vendors based on:
      i) the acquired carrying-out request information and
      ii) one or more item groups generated by the grouping of the items;
    provide at least one of the pieces of carrying-out information to a terminal;
    receive carrying-out processing response information from the terminal in response to the provided piece of carrying-out information;
    compare a requested quantity of the items to be carried out with a quantity of carried-out items, wherein the requested quantity is included in the carrying-out request information and the quantity of carried-out items is included in the carrying-out processing response information; and
    based on the comparison generate state information regarding the items corresponding to the carrying-out processing response information, the state information indicative of carrying-out states of the items corresponding to the carrying-out processing response information,
    wherein, the processor automatically generates the pieces of carrying-out information by:
    generating, per each of the plurality of vendors, one or more pieces of carrying-out information, wherein each of the one or more pieces of carrying-out information is related to a different item group.

* * * * *